(12) United States Patent
Barkan et al.

(10) Patent No.: US 11,334,736 B2
(45) Date of Patent: **\*May 17, 2022**

(54) DUAL MODE READER AND METHOD OF READING DPM CODES THEREWITH

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,832

(22) Filed: Aug. 5, 2020

(65) Prior Publication Data

US 2020/0364419 A1 Nov. 19, 2020

Related U.S. Application Data

(63) Continuation of application No. 16/208,153, filed on Dec. 3, 2018, now Pat. No. 10,740,581.

(51) Int. Cl.
*G06K 7/00* (2006.01)
*G06K 7/10* (2006.01)
*G06K 7/14* (2006.01)

(52) U.S. Cl.
CPC ....... *G06K 7/1096* (2013.01); *G06K 7/10732* (2013.01); *G06K 7/10831* (2013.01);
(Continued)

(58) Field of Classification Search
CPC ..... G06K 2007/10524; G06K 7/10732; G06K 7/10831; G06K 7/10881; G06K 7/1096; G06K 7/1408
See application file for complete search history.

(56) References Cited

U.S. PATENT DOCUMENTS

| 10,628,646 | B1 * | 4/2020 | Lozano | G06K 7/10732 |
| 10,740,581 | B2 * | 8/2020 | Barkan | G06K 7/10831 |
| 2004/0020990 | A1 | 2/2004 | Havens et al. | |

(Continued)

OTHER PUBLICATIONS

International Search Report and Written Opinion for International Application No. PCT/US2019/051971 dated Oct. 29, 2019.
(Continued)

*Primary Examiner* — Thien M Le
(74) *Attorney, Agent, or Firm* — Yuri Astvatsaturov

(57) ABSTRACT

Apparatuses and methods of reading DPM codes on objects therewith are provided. An apparatus includes a housing and a first imaging assembly housed within the housing and includes a first image sensor. The apparatus also has a second imaging assembly housed within the housing and includes a second image sensor. The apparatus also includes an illumination assembly configured to provide an illumination light having a central illumination axis. At least two of a FOV central axis of the first imaging assembly, a second FOV central axis of the second imaging assembly, and the central illumination axis pass through a plane within a first distance of no greater than about 40 mm of each other. The plane being (i) normal to the first FOV central axis and (ii) a second distance between about 0 to about 5 inches from a nose of the housing.

15 Claims, 9 Drawing Sheets

(52) U.S. Cl.
CPC ....... *G06K 7/10881* (2013.01); *G06K 7/1408* (2013.01); *G06K 2007/10524* (2013.01)

(56) References Cited

U.S. PATENT DOCUMENTS

| | | | |
|---|---|---|---|
| 2005/0224583 A1 | 10/2005 | Tamburrini | |
| 2006/0011724 A1* | 1/2006 | Joseph | H04N 5/3454 235/454 |
| 2006/0131419 A1* | 6/2006 | Nunnink | G06K 7/10732 235/472.02 |
| 2008/0105745 A1* | 5/2008 | Lei | G06K 7/12 235/462.1 |
| 2008/0105746 A1* | 5/2008 | Lei | G06K 7/10722 235/462.11 |
| 2008/0105748 A1* | 5/2008 | Lei | G06K 7/10722 235/462.42 |
| 2008/0105749 A1* | 5/2008 | Lei | G06K 7/10722 235/462.42 |
| 2008/0137324 A1* | 6/2008 | Pastore | G03B 15/06 362/16 |
| 2012/0153022 A1* | 6/2012 | Havens | G06K 7/1465 235/440 |
| 2015/0115032 A1* | 4/2015 | Chi | G06K 7/10732 235/455 |
| 2015/0178538 A1* | 6/2015 | Gerst, III | G06K 7/1098 235/472.01 |
| 2015/0269403 A1 | 9/2015 | Lei et al. | |
| 2018/0059758 A1* | 3/2018 | Boatner | G06K 7/1417 |
| 2019/0034677 A1* | 1/2019 | Gillet | G06K 7/10732 |
| 2019/0068856 A1* | 2/2019 | Kubon | H04N 5/2251 |
| 2020/0410181 A1* | 12/2020 | Rodriguez Ortiz | G06K 7/1417 |

OTHER PUBLICATIONS

Preliminary Search Report for Belgian Patent Application No. 201905862 dated Sep. 1, 2020.

* cited by examiner

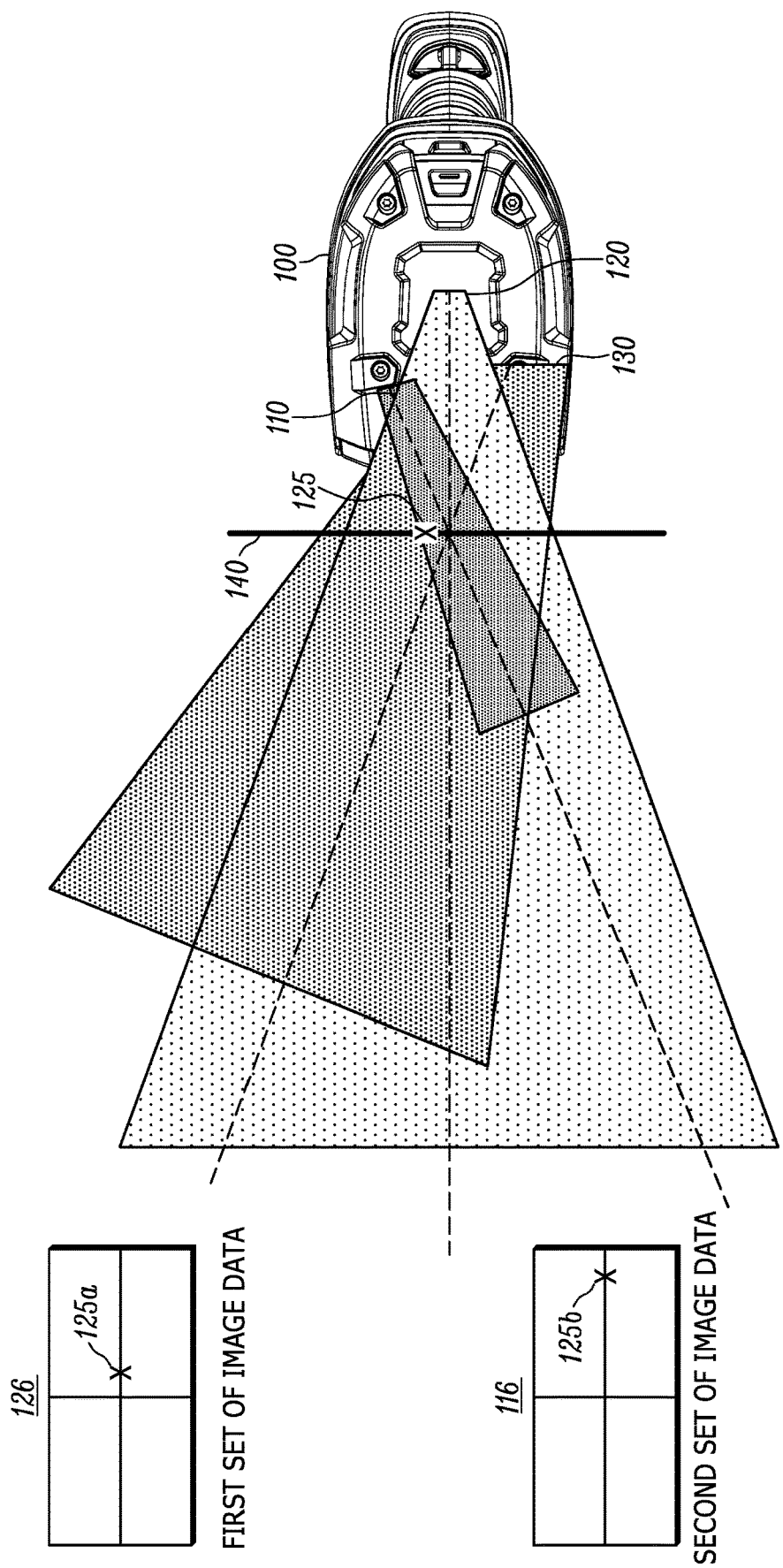

DUAL MODE READER AND METHOD OF READING DPM CODES THEREWITH

CROSS-REFERENCE TO RELATED APPLICATIONS

The present application is a continuation of U.S. patent application Ser. No. 16/208,153, now U.S. Pat. No. 10,740,581, filed on Dec. 3, 2018, and incorporated herein by reference in its entirety.

BACKGROUND OF THE INVENTION

Existing reader devices include a single imaging assembly configured to read a particular type of code. For example, one reader device may include an imaging assembly optimized to read barcodes printed on packaging; another reader device may include an imaging assembly optimized to read codes presented on a digital screen; yet another reader device may include an imaging assembly optimized to read direct part marking (DPM) codes. However, in some environments, the ability to read multiple types of code is required. Traditionally, one would have to carry around and switch between multiple reader devices to read the different types of codes. Accordingly, there is a need for a dual-mode reader and methods of reading DPM codes therewith.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4A illustrates example image data produced by a first imaging assembly and a second imaging assembly in an example scenario of reading a DPM code using the dual mode reader of FIG. 1 to provide feedback on positioning the dual mode reader with respect to the lateral and vertical axes.

Figure 1:
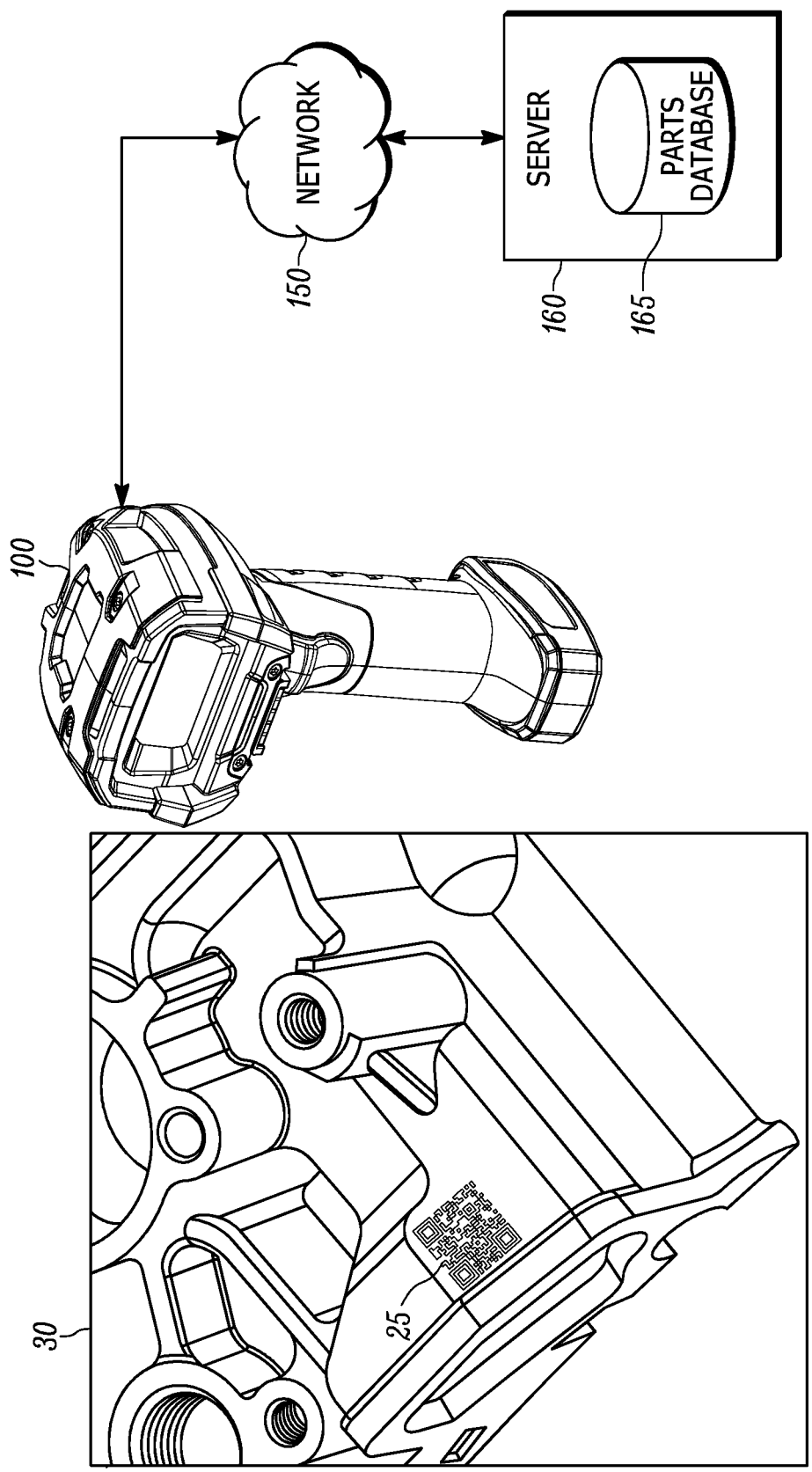
FIG. 1 is an example environment where a dual mode reader is used to read a DPM code on an object, in accordance with an example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the present disclosure include an apparatus for reading barcodes and direct part marking (DPM) codes that includes a housing and a first imaging assembly housed within the housing. The first imaging assembly includes a first image sensor and (i) has a first field of view (FOV) with a first FOV central axis and (ii) is configured to have a working range extending beyond about 5 inches. The apparatus also includes a second imaging assembly housed within the housing. The second imaging assembly includes a second image sensor and (i) has a second FOV with a second FOV central axis and (ii) is configured to have a working range extending up to about 5 inches. The apparatus also includes an illumination assembly configured to provide an illumination light having a central illumination axis. The apparatus is configured such that at least two of the first FOV central axis, the second FOV central axis, and the central illumination axis pass through a plane within a first distance of no greater than about 40 mm of each other. The plane being normal to the first FOV central axis and being a second distance between about 0 to about 5 inches from a nose of the housing.

Additional embodiments of the present disclosure include an apparatus for reading barcodes and direct part marking (DPM) codes including a housing and a first imaging assembly housed within the housing. The first imaging assembly includes a first image sensor and (i) has a first field of view (FOV) having a first FOV central axis and (ii) is configured to have a working range expanding beyond about 5 inches. The apparatus includes a second imaging assembly housed within the housing. The second imaging assembly includes a second image sensor and (i) has a second FOV having a second FOV central axis and (ii) is configured to have a working range expanding up to about 5 inches. The apparatus also includes an illumination assembly configured to provide an illumination light having a central illumination axis. The apparatus I configured such that the second FOV central axis intersects a plane at an angle between about 20° to about 40°, and wherein the plane is about normal to the first FOV central axis.

Further additional embodiments of the present disclosure include a method of reading direct part marking (DPM) codes by a reader having a (i) housing, (ii) a first imaging assembly housed with the housing, the first imaging assembly having a first field of view (FOV) with a first FOV central axis and being configured to have a working range extending beyond about 5 inches, (iii) a second imaging assembly housed within the housing, the second imaging assembly having a second FOV that has a second FOV central axis, and (iv) an illumination assembly housed within the housing, the second imaging assembly and the illumination assembly being configured such that the second FOV central axis and the central illumination axis pass through a plane within a first distance of no greater than about 40 mm of each other and the plane being a second distance from a nose of the reader, the second distance defining an optimal distance to read a DPM code. The method includes capturing a first set of image data by the first imaging assembly and analyzing, by one or more processors, the first set of image data to detect a presence of a feature of the DPM code on an object. The method also includes analyzing, by the one or more processors, the first set of image data to determine a third distance from the nose of the reader to the DPM code on the object. The method also includes comparing, by the one or more processors, the second distance to the third distance and providing, by the one or more processors, an indication of a direction to move at least one of the reader or the object to reduce a difference between the second distance and the third distance. Additionally, the method includes capturing a second set of image data by the second imaging assembly and decoding, by the one or more processors, the DPM code by analyzing the second set of image data.

Referring now to FIG. 1, illustrated is an example environment 10 where a dual mode reader 100 is used to read a DPM code 25 on an object 30. The DPM code 25 may encode information using a one-dimensional or two-dimensional pattern. Accordingly, the DPM code 25 may be encoded using a pattern of topographical indications (e.g., varying the height of the object surface such as by removing or displacing material of the object 30, such as by use of a dot peen) or using a pattern of textural indications (e.g., using ablation techniques to cause some portions of the object 30 to be rough and other portions of the object 30 to be smooth). Due to the pattern of the DPM code 25 being encoded directly into the object 30, the DPM code 25 should be illuminated at an off-axis angle for an imaging assembly to be able to detect the pattern (or the shadows and/or reflections caused by the pattern). In some embodiments, the angle (θ) can be about 60°. In other embodiments, θ can be about 50° to about 70°, or even about 40° to about 80°. Consequently, readers that provides coaxial illumination (i.e., where θ is about 0°), such as a conventional barcode reader, have a difficult time detecting and/or decoding DPM codes.

Moreover, the DPM code 25 is generally smaller than conventional barcodes. For example, many electronics include DPM codes on the scale of a few millimeters. Conversely, conventional barcodes are on the scale of several inches. Accordingly, while conventional barcode readers include image sensors that can detect these larger barcodes at distances at least eight inches away from a nose of the reader 100, these conventional barcode image sensors have too low of a pixel density (and/or the field of view (FOV) of the image sensor is too wide) to detect the pattern of the DPM code 25. Accordingly, an image sensor configured to detect the DPM code 25 has a narrower FOV and/or configured to have a higher pixel density. As a result, the read range of the image sensor configured to sense the DPM code 25 extends only to about five inches from the nose of the reader 100. Thus, to be configured to read both barcode and DPM codes, the reader 100 includes a first imaging sensor configured to read barcode and a separate second imaging sensor configured to read DPM codes, such as the DPM code 25.

It should be appreciated that because the reader 100 is a dual mode reader, the configuration of different imaging assemblies should enable the reader 100 to readily read barcodes or DPM codes. That is, the arrangement of the imaging assemblies should provide the off-axis illumination for the DPM code imaging assembly while still enabling normal operation of the barcode imaging assembly.

Generally, the DPM code 25 encodes information about the object 30, such as serial number, a part number, or another identifier of the object 30, a manufacturing date and/or location of the object 30, and/or a manufacturer of the object 30. Accordingly, many manufacturing environments involve scanning a plurality of objects 30 that combine to form a larger product with a reader device. In these environments, each object 30 may have a respective DPM code 25. By reading the DPM codes 25 of each object 30, one can generate a build of materials included in the product and/or verify that each object 30 included in the product is in the right location.

Thus, in addition to decoding the DPM code 25, the reader 100 may also be configured to communicate with a remote server 160 via a network 150. It should be appreciated that the network 150 may comprise any number of wired or wireless networks, such as Ethernet, IEEE 802.11 (WiFi), Long Term Evolution (LTE), Bluetooth or any other known communication protocol. For example, the environment 10 may include an access point that provides Wi-Fi coverage at a manufacturing plant. In this example, the reader 100 connects to the Wi-Fi network to transmit information encoded by the DPM code 25 to the access point, which then may communicate with the server 160 via a wired backhaul network (e.g., a LAN or the Internet). In some embodiments, when the server 160 receives the information encoded by the DPM code 25, the server 160 updates a record in a parts database 165 for the product to include an indication of the object 30.

Figure 2A:
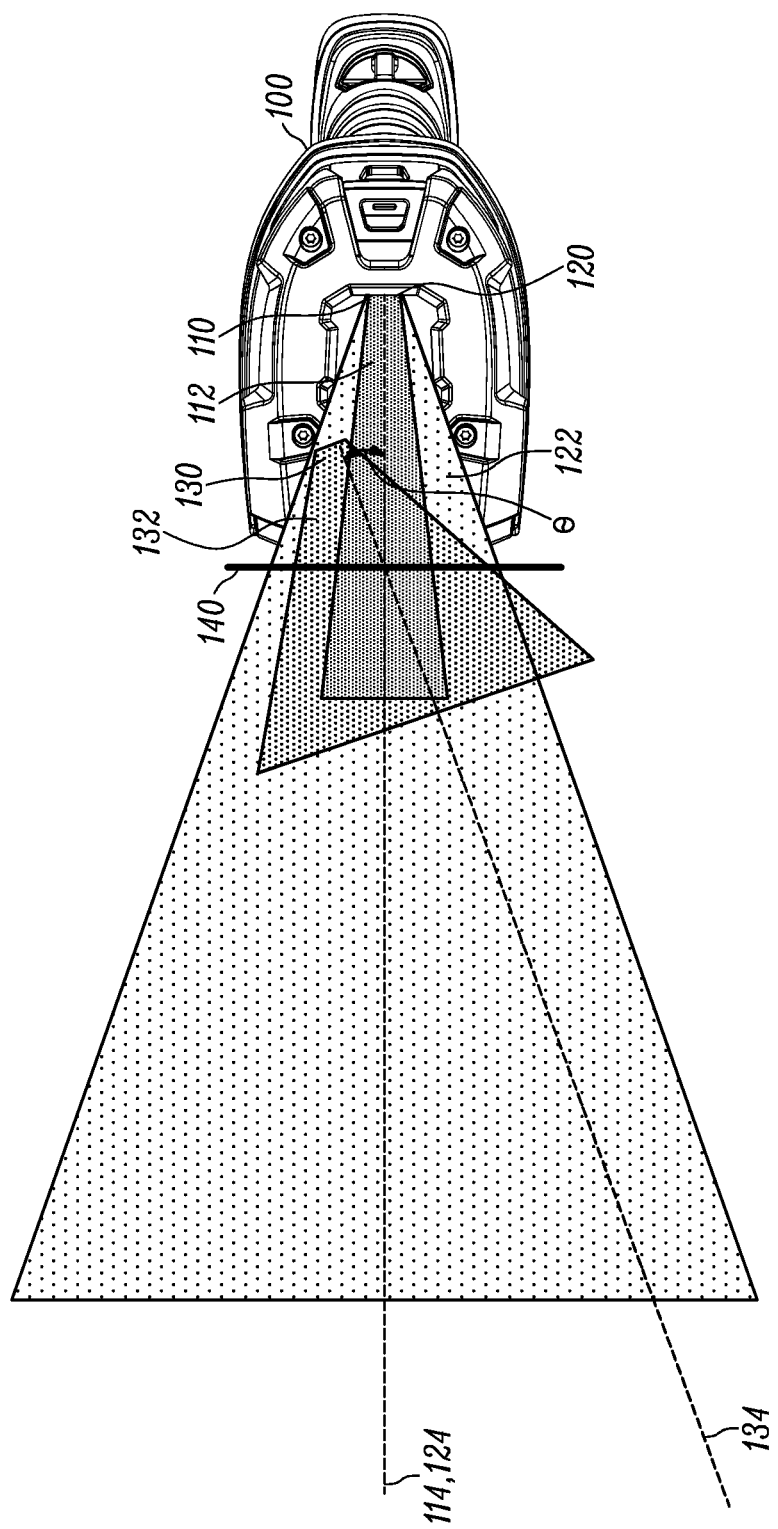
FIGS. 2A-2C are overhead perspective views illustrating example arrangements of a first imaging assembly, a second imaging assembly, and an illumination assembly within a head cavity, in accordance with example embodiments of the dual mode reader of FIG. 1.
Figure 2B:
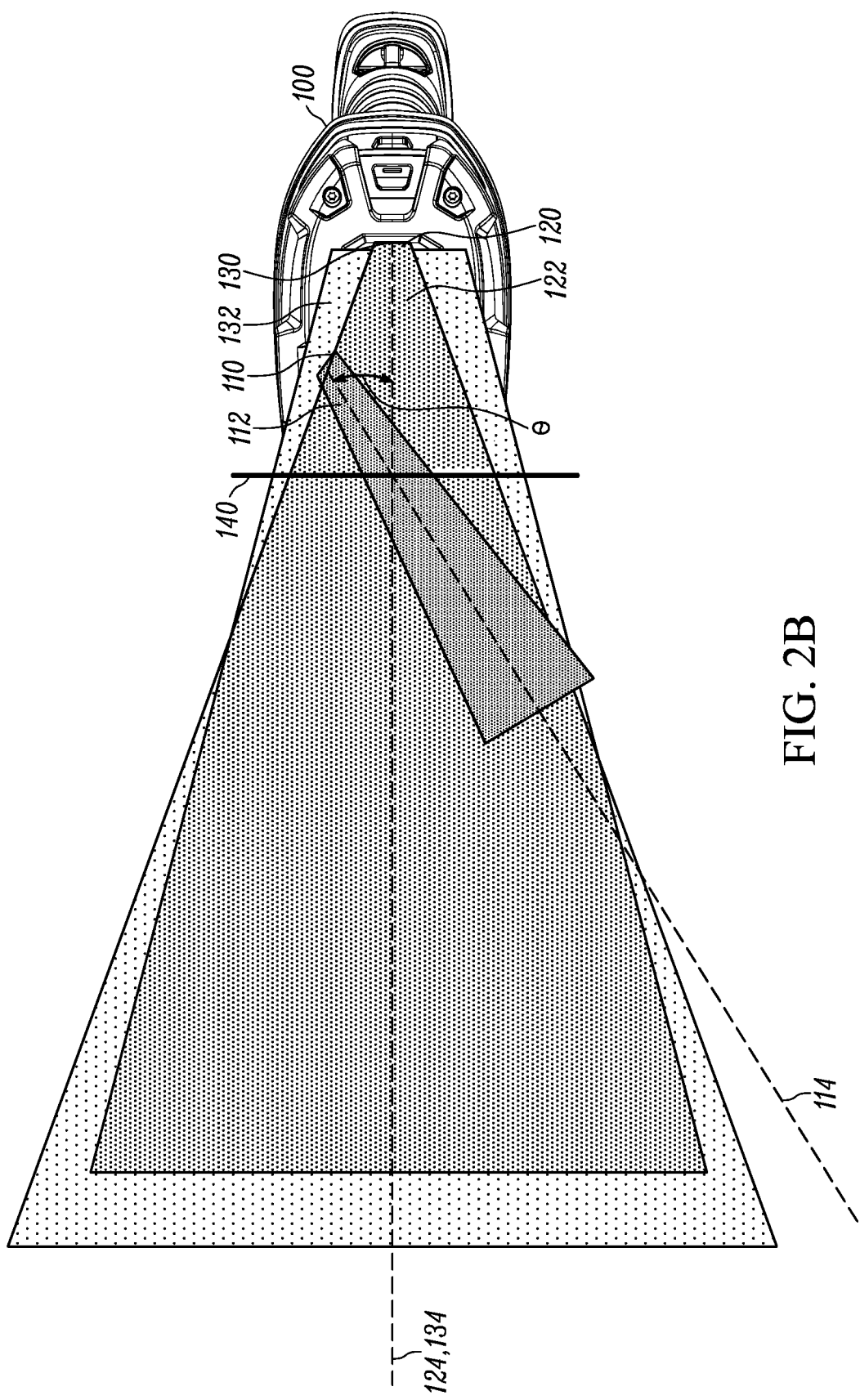
Figure 2C:
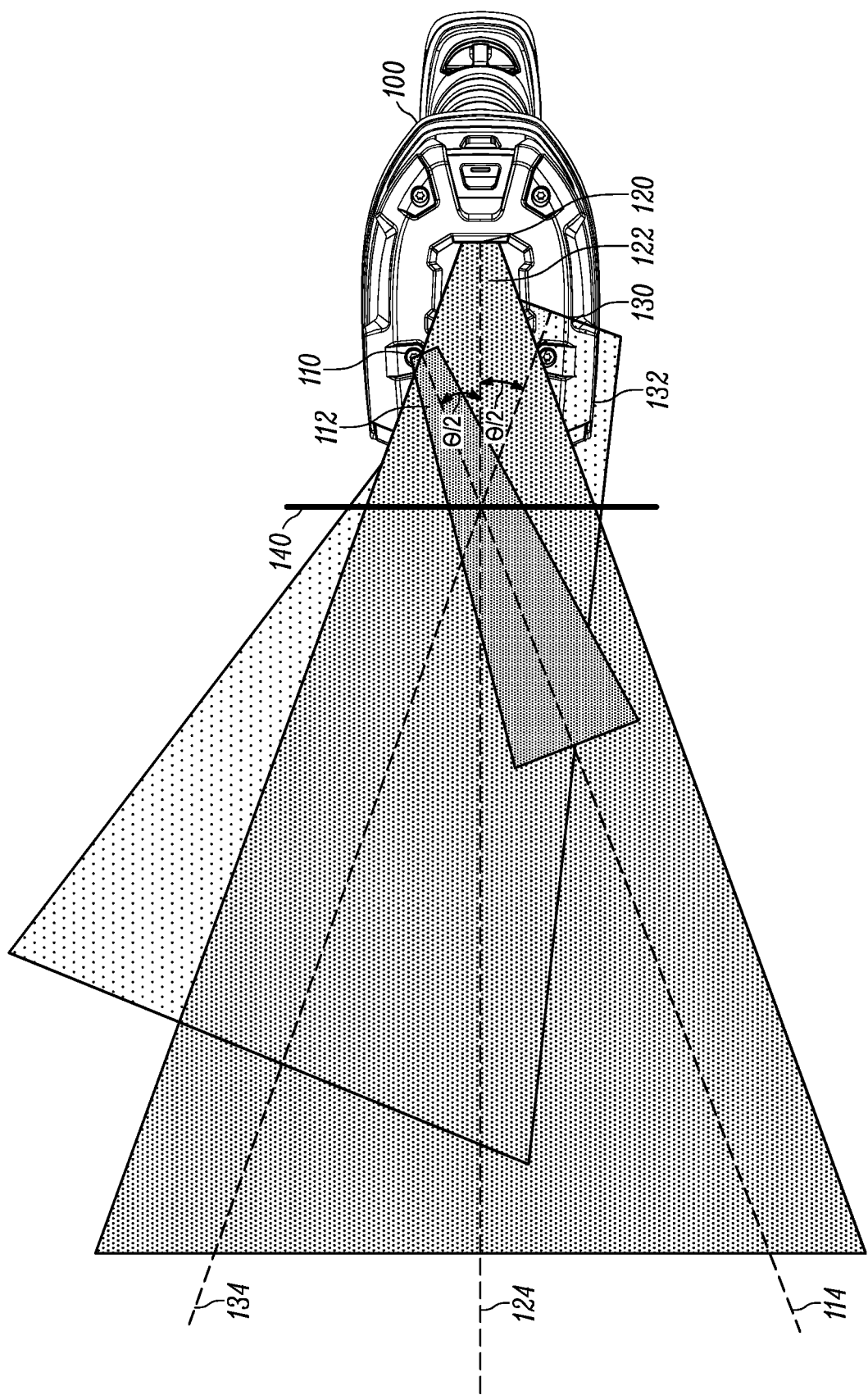

FIGS. 2A-2C are overhead perspective views illustrating example arrangements of a first imaging assembly 120, a second imaging assembly 110, and an illumination assembly 130 within a head cavity defined by a housing of the reader 100 of FIG. 1. More particularly, the first imaging assembly 120 is an imaging assembly configured to read barcodes and the second imaging assembly 110 is an imaging assembly configured to read DPM codes, such as the DPM code 25. As described above, in order for the second imaging assembly 110 to detect the DPM code 25, the illumination assembly 130 is arranged off-axis to the second imaging assembly 110. Thus, FIGS. 2A-2C illustrate different configuration to achieve this off-axis illumination when the first imaging assembly 120, the second imaging assembly 110, and the illumination assembly 130 are housed within the head cavity of the reader 100.

As illustrated in FIGS. 2A-2C, the first imaging assembly 120 includes a first image sensor that has a first field of view (FOV) 122 centered about a central axis 124. Similarly, the second imaging assembly 110 has a second image sensor that has a second FOV 112 centered about central axis 114. Additionally, the illumination assembly 130 is configured to provide illumination light 132 centered about a central illumination axis 134.

It should be appreciated that due to the overhead perspective, the vertical axis with respect to the reader 100 is flattened. Thus while the first imaging assembly 120, the second imaging assembly 110, and the illumination assembly 130 appear to be vertically aligned in FIGS. 2A-2C, in some embodiments, the first imaging assembly 120, the second imaging assembly 110, and the illumination assembly 130 are vertically offset from one another.

Additionally, while FIGS. 2A-2C depict the first central axis 124, the second central axis 114, and the central illumination axis 134 intersecting at the same point, this is done for ease of illustration. In embodiments described herein, the first central axis 124, the second central axis 114, and the central illumination axis 134 need only approach a threshold distance from one another. For example, the threshold distance may be 20 mm, 30 mm, 40 mm, or even 60 mm. Thus, in some embodiments, the first central axis 124, the second central axis 114, and the central illumination axis 134 never actually intersect. That said, for ease of explanation, the present disclosure may refer to two or more axes "intersecting." However, any such description envisions the embodiments where the two axes do not actually intersect, but instead pass within the threshold distance from one another.

As illustrated, the first central axis 124, the second central axis 114, and the central illumination axis 134 intersect at a plane 140. To ensure normal operation of the first imaging assembly 120 when reading barcodes, the plane 140 is defined to be normal to the first FOV central axis 124. Moreover, due to the working range of the second imaging assembly 110 extending up to about five inches from a nose of the reader 100, the plane 140 is also located within up to about five inches from the nose of the reader 100. As a result, the second imaging assembly 110 is able to decode the DPM code 25 when the DPM code 25 is located at the point of intersection.

Referring particularly to FIG. 2A, illustrated is an embodiment where the first imaging assembly 120 and the second imaging assembly 110 are configured such that the first FOV central axis 124 is substantially parallel to the second FOV central axis 114. While FIG. 2A illustrates the first imaging assembly 120 and the second imaging assembly 110 being co-located, in some embodiments, the first imaging assembly 120 and the second imaging assembly 110 are offset from one another.

To achieve the off-axis illumination that enables the second imaging assembly 110 to read the DPM code 25, the illumination assembly 130 is configured to be offset from the second imaging assembly 110 and the first imaging assembly 120. More particularly, the illumination assembly 130 is configured such that the central illumination axis 134 forms an offset angle θ of about 50° to 70° from the second FOV central axis 114 at the plane 140. In the illustrated embodiment, the offset is achieved by disposing the illumination assembly 130 in the head cavity closer to a nose of the reader 100 than the second imaging assembly 110.

Turning to FIG. 2B, illustrated is an embodiment where the illumination assembly 130 and the second imaging assembly 110 are configured such that the first FOV central axis 124 is substantially parallel to the central illumination axis 134. While FIG. 2B illustrates the first imaging assembly 120 and the illumination assembly 130 being co-located, in some embodiments, the first imaging assembly 120 and the illumination assembly 130 are offset from one another.

To achieve the off-axis illumination that enables the second imaging assembly 110 to read the DPM code 25, the second imaging assembly 110 is configured to be offset from the illumination assembly 130 and the first imaging assembly 120. More particularly, the second imaging assembly 110 is configured such that the second FOV central axis 114 forms an offset angle θ of about 50° to 70° from the central illumination axis 134 at the plane 140. In the illustrated embodiment, the offset is achieved by disposing the second imaging assembly 110 in the head cavity closer to a nose of the reader 100 than the second imaging assembly 110.

Turning to FIG. 2C, illustrated is an embodiment where the illumination assembly 130 and the second imaging assembly 110 are configured such that both of the illumination assembly 130 and the second imaging assembly 110 are offset from the first imaging assembly 120. While FIG. 2C illustrates the second imaging assembly 110 and the illumination assembly 130 being equally offset from the first imaging assembly 120, in some embodiments, the second imaging assembly 110 and the illumination assembly 130 may be offset in accordance with any ratio that achieves the off-axis illumination angle θ of about 50° to 70° at the plane 140.

Figure 3:
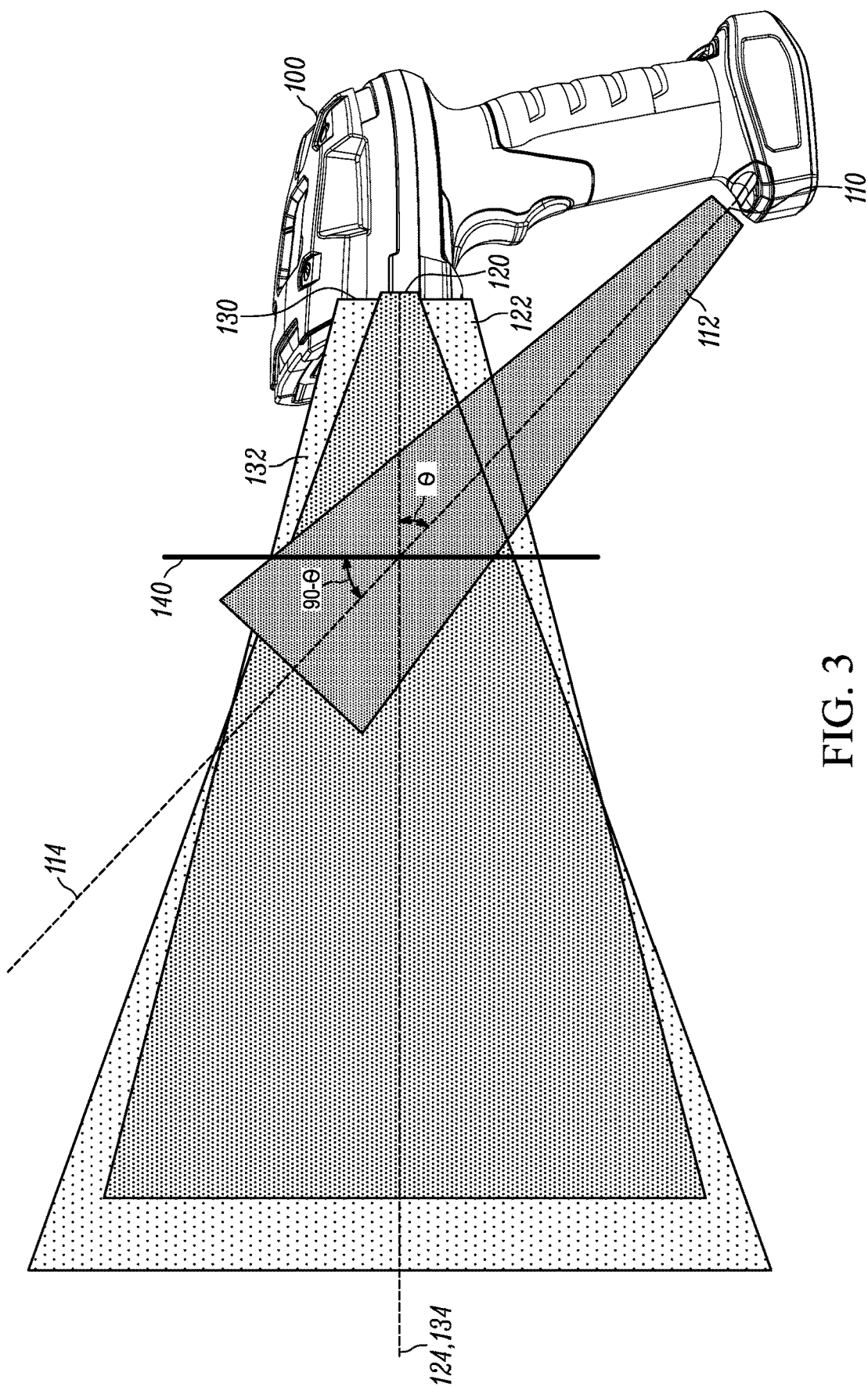
FIG. 3 is a side perspective view illustrating an arrangement of a first imaging assembly, a second imaging assembly, and an illumination assembly within a head cavity and a base cavity, in accordance with an example embodiment of the dual mode reader of FIG. 1.

FIG. 3 is a side perspective view illustrating an arrangement of a first imaging assembly 120, a second imaging assembly 110, and an illumination assembly 130 within a head cavity and a base cavity defined by a housing of the reader 100 of FIG. 1. More particularly, the second imaging assembly 110 is disposed in the base cavity of the reader 100 and the first imaging assembly 120 and the illumination assembly 130 are disposed in the head cavity of the reader 100. In alternative, non-illustrated embodiments, the illumination assembly 130 is disposed in the base cavity of the reader 100 and the first imaging assembly 120 and the second imaging assembly 110 are disposed in the head cavity of the reader 100.

It should be appreciated that due to the side perspective, the latitudinal axis with respect to the reader 100 is flattened. Thus while the first imaging assembly 120, the second imaging assembly 110, and the illumination assembly 130 appear to be latitudinally aligned in FIG. 3, in some embodiments, the first imaging assembly 120, the second imaging assembly 110, and the illumination assembly 130 are latitudinally offset from one another.

As described above, in order for the second imaging assembly 110 to detect the DPM code 25, the illumination assembly 130 is arranged off-axis to the second imaging assembly 110. Unlike the embodiments described with respect to FIGS. 2A-2C, in the embodiment of the reader 100 illustrated in FIG. 3 achieves the off-axis illumination is achieved by offsetting the second imaging assembly 110 generally along the vertical axis. As a result, the illumination assembly 130 is still configured such that the central illumination axis 134 forms an offset angle θ of about 50° to 70° from the second FOV central axis 114 at the plane 140. Said another way, the second FOV central axis 114 passes through the plane 140 at an angle of 90°−θ (20° to 40°).

It should be appreciated that both the first imaging assembly 120 and the second imaging assembly 110 are able to generate sets of image data contemporaneously with one another. Accordingly, the set of image data sensed by the first imaging assembly 120 may be compared to set of image data sensed by the second imaging assembly 110 to determine how to align the object 30 and the reader 100 such that the DPM code 25 is located at the intersection of the second FOV central axis 114 and the central illumination axis 134. Said another way, the reader 100 analyzes the parallax effect between the first imaging assembly 120 and the second imaging assembly 110 to determine a position where the DPM code 25 should be located such that the DPM code 25 is illuminated with the off-axis illumination that enables the reader 100 to detect and decode the DPM code 25.

Figure 4B:
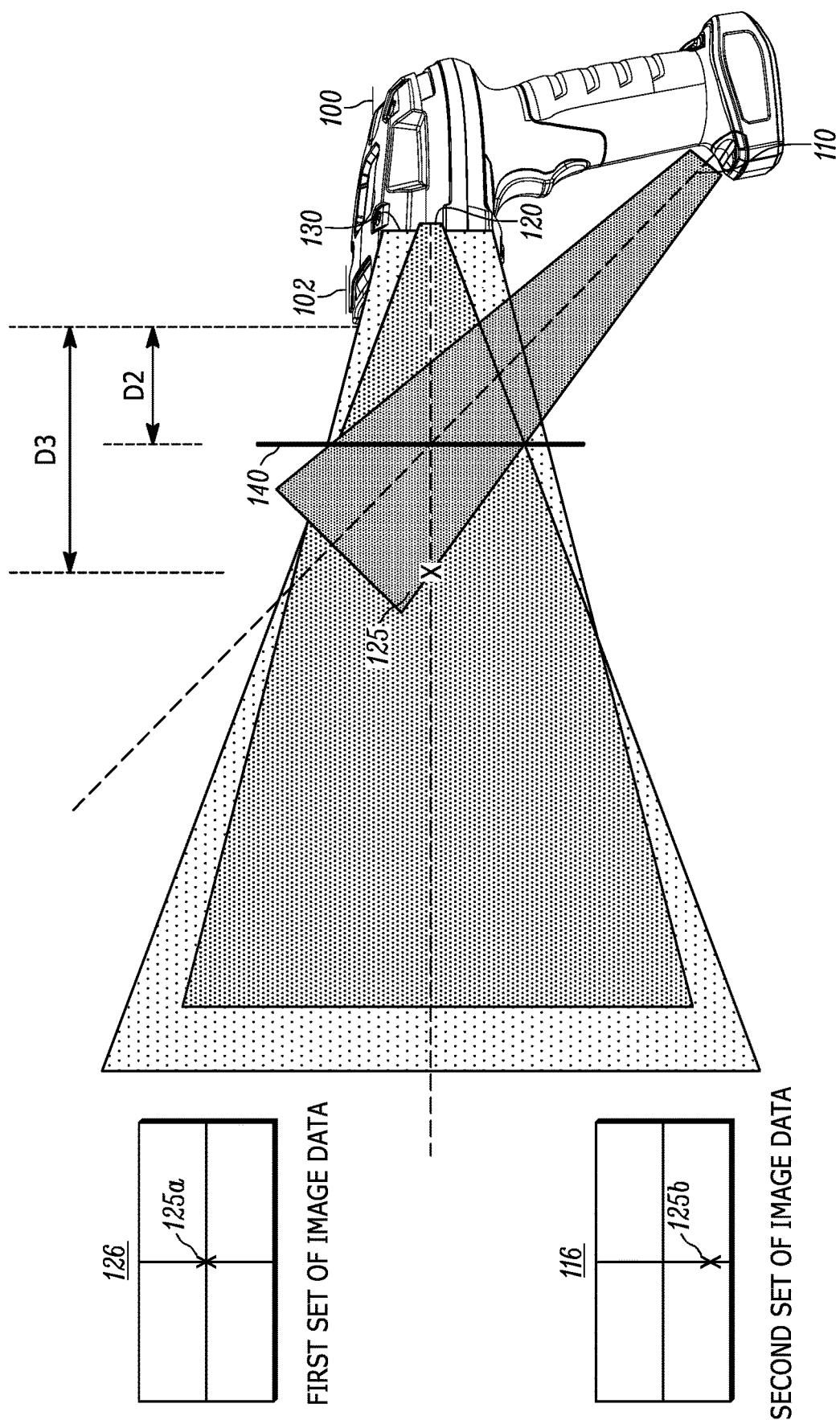
FIG. 4B illustrates example image data produced by a first imaging assembly and a second imaging assembly in an example scenario of reading a DPM code using the dual mode reader of FIG. 1 to provide feedback on positioning the dual mode reader with respect to the longitudinal axis.

To this end, FIGS. 4A-4B illustrate example sets of image data produced by the first imaging assembly 120 and the second imaging assembly 110 that are analyzed by the reader 100 to provide feedback on positioning the dual mode reader 100 and/or the object 30. More particularly, the reader 100 is configured to analyze a set of image data 126 sensed by the first imaging assembly 110 to identify a feature 125 of the DPM code 25. For example, the feature 125 may be the general shape of the DPM code 25, a particular edge of the DPM code, an additional marking on the object 30 used to identify the DPM code 25, or any other feature associated with the DPM code 25. If the reader 100 detects the feature 125, the reader 100 then analyzes a set of image data 116 sensed by the second imaging assembly 110 to detect the same feature 125 as represented in the set of image data 116. Based on the known configuration between the first imaging assembly 120 and the second imaging assembly 110, and the relative positions of the feature 125 between the set of image data 126 and the set of image data 116, the reader 100 is able to provide feedback on the direction to move at least one of the object 30 and the reader 100.

For example, in the scenario illustrated in FIG. 4A, the reader 100 of the embodiment illustrated in FIG. 2C is used to read the DPM code 25. As illustrated, the reader 100 detected the feature 125 associated with the DPM code 25 within the first set of image data 126. More particularly, as represented by the first set of image data 126, the feature 125a appears to be just slightly to the right of the center of the first FOV 122.

On the other hand, due to the different positions of the first imaging assembly 120 and the second imaging assembly 110, the feature 125 is in a different location as represented the second set of image data 116. More particularly, the feature 125b appears to be significantly further to the right of the center of the second FOV 112. Accordingly, because the reader 100 knows that, in this particular embodiment, the second imaging assembly 110 is offset latitudinally to the right of the first imaging assembly 120, the reader 100 is able to determine that the DPM code 25 is positioned to the right latitudinally for the intersection point of the second FOV central axis 114 and the plane 140. As a result, the reader 100 is configured to provide feedback to a user of the reader 100 to align the DPM code 25 and the intersection point, such as by rotating the reader 100 to the right and/or moving the object 30 to the left.

As another example, in the scenario illustrated in FIG. 4B, the reader 100 of the embodiment illustrated in FIG. 3 is used to read the DPM code 25. As illustrated, the reader 100 detected the feature 125 of the DPM code 25 within the first set of image data 126. More particularly, within the first set of image data 126, the feature 125a appears to at the center of the first FOV 122. On the other hand, due to the different positions of the first imaging assembly 120 and the second imaging assembly 110, the feature 125 is in a different location as represented by the second set of image data 116. More particularly, the feature 125b appears to be towards the bottom edge of the second FOV 112.

Accordingly, because the reader 100 knows that, in this particular embodiment, the second imaging assembly 110 is vertically offset below the first imaging assembly 120, the reader 100 is able compare the positions of feature 125b and the known relative position of the second imaging assembly 110 with respect to the first imaging assembly 120 to determine that the DPM code 25 is positioned at a distance D3 from the nose 102 of the reader 100. Because the optimal distance to read the DPM code is the distance D2 (i.e., the position where the central illumination axis 134 intersects the second FOV central axis 114 at the plane 140), the reader 100 is able to compare D3 to D2 to determine a direction to move at least one of the object 30 and the reader 100 to reduce the difference between D2 and D3. In the illustrated scenario, this means moving at least one of the reader 100 and the object 30 closer to the other.

Of course, the scenarios illustrated in FIGS. 4A-4B are just two example scenarios in which the relative position between the features 125a and 125b and the first imaging assembly 120 and the second imaging assembly 110 are compared to determine the position of the feature 125 (and, by proxy, the position of the DPM code 25). For example, depending on the particular offset angle between the first imaging assembly 120 and the second imaging assembly 110, displacement along either axis between the first set of image data 126 and the second set of image data 116 of the feature 125 may be associated a component along any of the latitudinal, longitudinal, or vertical axes. Thus, different embodiments of the dual mode reader 100 associate the two-dimensional displacement axes with different three-dimension scaling components. In some embodiments, the reader 100 executes a calibration routine to determine the particular scaling components prior to using the reader 100 to read the DPM code 25. As a result, the distance D3 may be determined by comparing a displacement of the feature 125a from a center pixel of the first set of image data 126 to a displacement of the feature 125b from a center pixel of the second set of image data 116.

Figure 5:
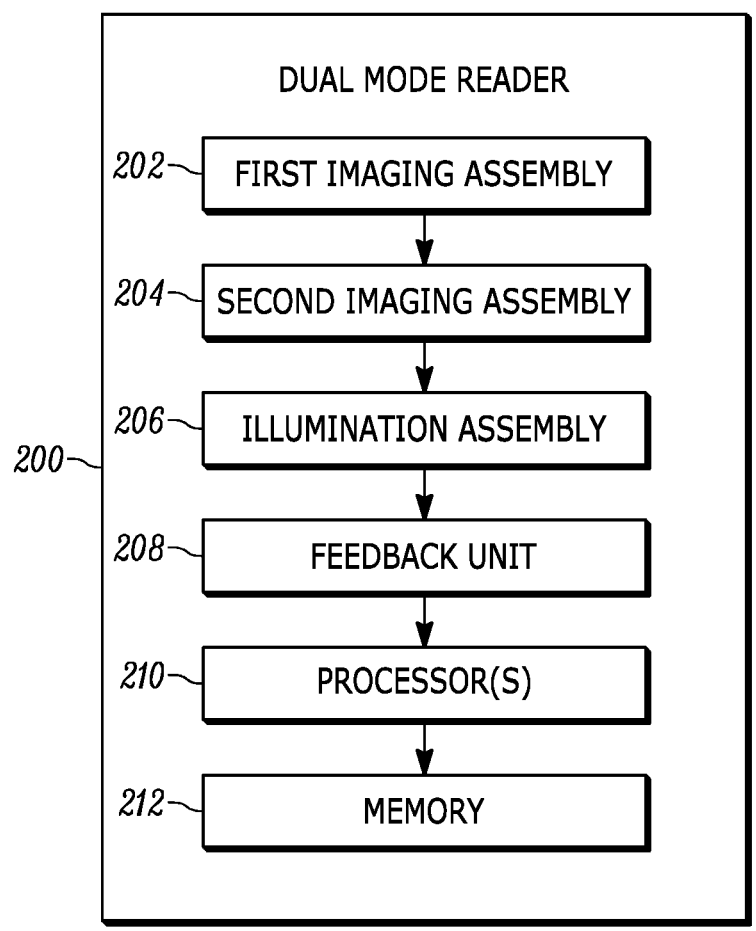
FIG. 5 is a block diagram representative of an embodiment of the dual mode reader of FIG. 1.

Turning now to FIG. 5, illustrated is a block diagram representative of a dual mode reader 200, such as the dual mode reader 100 of FIGS. 1-4. In the illustrated example, the reader 200 includes a first imaging assembly 202 generally configured to sense barcodes. The first imaging assembly 202 may be a camera and include any known imaging components for capturing image data. For example, the first imaging assembly 202 may include an array of image sensors configured to detect reflections of light that pass through a lens system. In some embodiments, the first imaging assembly 202 includes an illumination assembly configured to emit light at a particular frequency or range of frequencies. Additionally or alternatively, the first imaging assembly 202 may include one or more filters configured to filter the reflected light before and/or after it is sensed by the image sensor array.

Similarly, the example dual mode reader 200 also includes a second imaging assembly 204 generally configured to sense DPM codes, such as the DPM code 25. For example, as compared to the first imaging assembly 202, the second imaging assembly 204 is configured to have a higher pixel density that enables the second imaging assembly 204 to read relatively small DPM codes. In some embodiments, to achieve this higher pixel density, the second imaging assembly 204 is configured to have a narrower field of view than the first imaging assembly 202. That said, like the first imaging assembly 202, the second imaging assembly 204 may be a camera and include any known imaging components for capturing image data and may include an array of image sensors configured to detect reflections of light that pass through a lens system. Additionally or alternatively, the second imaging assembly 204 may include one or more filters configured to filter the reflected light before and/or after it is sensed by the image sensor array.

Unlike the first imaging assembly 202 which may include an illumination assembly to provide the (on-axis) backlighting generally required to read barcodes, the second imaging assembly 204 may be associated with a separately located illumination assembly 206 configured to provide an illumination light at an off-axis angle θ with respect to the second imaging assembly 204. It should be appreciated that in embodiments where the central illumination axis is substantially parallel to the field of view central axis of the first imaging assembly 202 (e.g., the example embodiments of FIGS. 2B and 4), the illumination assembly included in the first imaging assembly may also be the imaging assembly 206 associated with the second imaging assembly 204. Thus, at least in these embodiments, the dual mode reader 100 may be constructed such that only a single illumination assembly is needed to support the ability of the reader 200 to read both barcodes and DPM code, thereby reducing the cost of construction of the reader 200.

The example dual mode reader 200 also includes a feedback unit 208 configured to provide feedback to a user of the dual mode reader 200 about a direction to move at least one of the object 30 and the dual mode reader 200 to read the DPM code 25. In some embodiments, the feedback unit 208 include one or more speakers to provide audio feedback to the user of the dual mode reader 200. Additionally or alternatively, the feedback unit 208 may include one or more types of visual indicators (e.g., one or more light emitting diodes (LEDs), a display screen, indicator arrows, and so on) and/or a vibrator configured to provide haptic feedback.

To determine the feedback to provide via the feedback unit 208, the example dual mode reader 200 includes one or more processors 212 configured to execute one or more processor-executable instructions stored in a memory 210 associated with the systems and methods as described herein, for example, implement the example operations represented by the block diagrams or flowcharts of the drawings accompanying this description. In some embodiments, the processor-executable instructions form a feedback application configured to cause the one or more processors 212 to analyze sets of image data sensed by the first imaging assembly 202 and the second imaging assembly 204. In some embodiments where the one or more processors 212 have sufficient processing power, the one or more processors 212 process the sets of image data generated by the first and second imaging assemblies 202 and 204 in parallel. In other embodiments, the one or more processors 212 interleaves the processing of the set of image data sensed by the first imaging assembly 202 and the processing of the set of image data sensed by the second imaging assembly 204.

Based on the analysis of the sets of image data, the one or more processors 212 are able to determine a relative position between the DPM code 25 and the dual mode reader 200. The one or more processors 212 are then configured to generate one or more commands that cause the feedback unit 208 to indicate a direction to move at least one of the object 30 and the dual mode reader 200 to align the DPM code 25 with an optimal location for the dual mode reader 200 to read the DPM code 25. For example, the commands may be formatted to include a string of text for output (visually and/or audibly), indicate a particular LED of the feedback unit 208 to illuminate, provide a directional indicator on a display screen of the feedback unit 208, and/or provide a haptic response indicative of a direction to move at least one of the object 30 and the dual mode reader 200.

Figure 6:
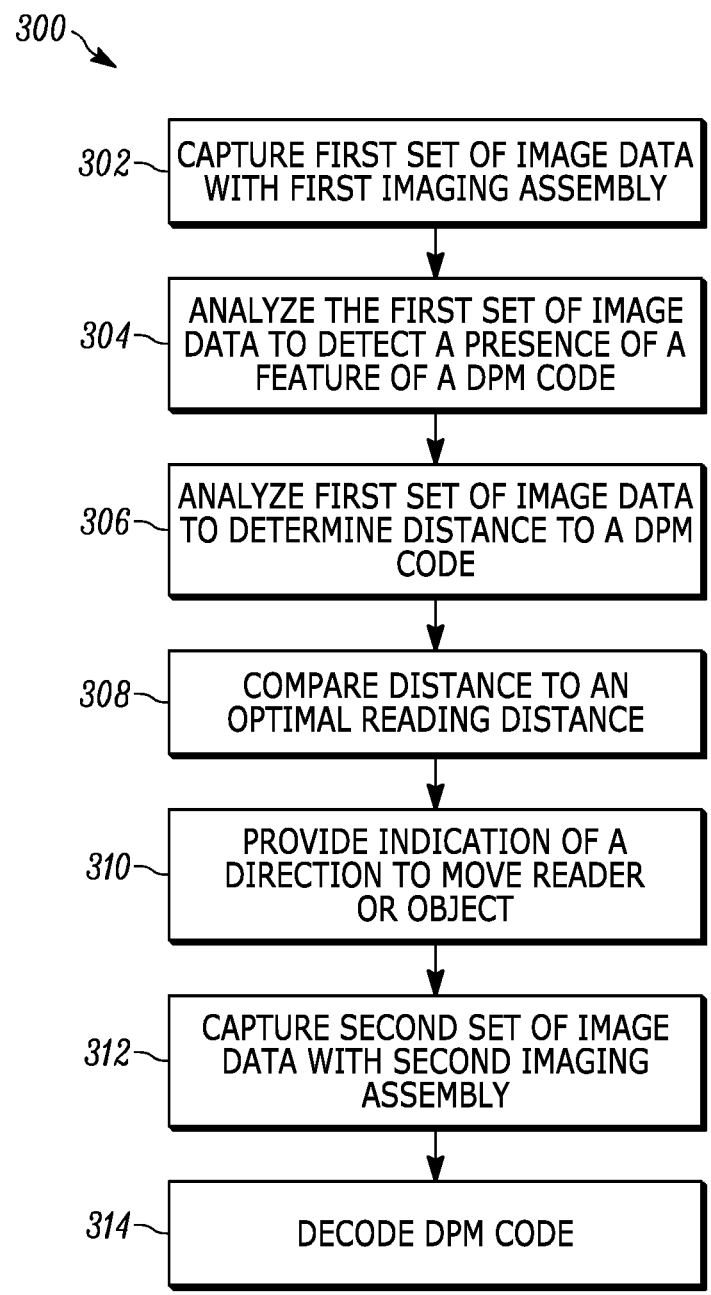
FIG. 6 is a flow chart of a method for reading DPM codes using the dual mode reader of FIG. 1, in accordance with an example embodiment.

FIG. 6 is a flow chart of a method 300 for reading DPM codes (such as a DPM code 25 of FIG. 1) using a dual mode reader (such as the example dual mode readers of FIGS. 1-5), in accordance with an example embodiment. The method 300 may be performed by the processors 212 of the dual mode reader 200 executing a set of processor-executable instructions stored at the memory 210.

The method 300 begins at block 302 when the dual mode reader captures a first set of image data using the first imaging assembly (such as the first imaging assembly 120 of FIGS. 1-4 or the first imaging assembly 202 of FIG. 5). The processors 212 of the reader 200 may be configured to periodically (e.g., twenty four times a second, ten times a second, five times a second, every second) trigger the first imaging assembly to capture a set of image data. As described herein, the first imaging assembly is generally configured to read barcodes. Thus, the first imaging assembly may have a working range that extends beyond about five inches from the nose of the dual more reader.

At block 304, the dual mode reader analyzes the first set of image data to detect a presence of a feature (such as the feature 125 of FIGS. 4A and 4B) of the DPM code on an object (such as the object 30 of FIG. 1). It should be appreciated that dual mode reader generally cannot know for certain that a DPM code is represented by the first set of image data without successfully decoding the DPM code. Thus, the dual mode reader is configured to identify particular features of the DPM code that are indicative of the presence of the DPM code on the object. For example, the feature may be a particular shape or pattern of shapes detected on the object.

At block 306, the dual mode reader analyzes the first set of image data to determine a third distance from the nose of the reader to the DPM code on the object. In some embodiments, the third distance is determined based upon a size of the feature. In these embodiments, the dual mode reader knows an expected size of the DPM code based on, for example, an object type of the object. Accordingly, by comparing the size of the feature in the first set of image data to the expected size, the dual mode reader is able to determine a distance from the nose of the reader to the DPM code.

In other embodiments, the reader determines the third distance by comparing the first set of image data to a third set of image data captured by a second imaging assembly configured to read DPM codes. For example, as described with respect to FIGS. 4A and 4B, the reader may detect the presence of the feature in the third set of image data and determine an amount the representation of the feature is offset along the two different axes. Based on the known correlation between displacement in the image data and the corresponding position along the latitudinal, longitudinal, and vertical axes of the environment in which the reader and the object are located, the reader is able to calculate a longitudinal depth from the nose of the housing at which the feature is located.

At block 308, the dual mode reader compares the third distance determined at block 306 to a second distance indicative of an optimal distance to read a DPM code. In some embodiments, the optimal distance is between zero and five inches from the nose of the reader and is where the central FOV axis of the second imaging assembly and a central illumination axis "intersect" (i.e., pass through a plane within a first distance of no greater than about 40 mm from each other). If the third distance is greater than the second distance, the dual mode reader may determine that the DPM code is located too far from the dual mode reader. On the other hand, if the third distance is less than second distance, the dual mode reader may determine that the DPM code is located too close to the dual mode reader.

At block 310, the dual mode reader is configured to provide, an indication of a direction to move at least one of the dual mode reader or the object to reduce a difference between the second distance and the third distance. More particularly, the dual mode reader is configured to provide the indication via a feedback unit (e.g., the feedback unit 208 of the dual mode reader 200 of FIG. 5). If the DPM code is located too far from the dual mode reader, the dual mode reader is configured to provide an indication to move at least one of the object and the dual mode reader closer to one another. On the other hand, if the DPM code is located too near to the dual mode reader, the dual mode reader is configured to provide an indication to move at least one of the object and the dual mode reader further from one another.

At block 312, the dual mode reader is configured to capture a second set of image data by the second imaging assembly. The processors 212 of the reader 200 may be configured to periodically (e.g., twenty four times a second, ten times a second, five times a second, every second) trigger the second imaging assembly to capture a set of image data. If the user properly complied with the feedback provided at block 310, the DPM code is now located at about the second distance. Thus, at block 314, the dual mode reader is able to decode the DPM code by analyzing the second set of image data. However, if the user has not yet complied with the feedback provided at block 310 and/or overcompensated to the feedback provided at block 310, the method 300 may return to block 302 where the dual mode reader captures additional image data with the first imaging assembly to provide additional feedback on how to position at least one of the object and the dual mode reader.

As described herein, the dual mode reader may be utilized in a manufacturing environment in which the object 30 is a component of a larger product being assembled at a plant. In these embodiments, the method 300 may include an additional block where the dual mode reader determines an identifier of the object encoded by the DPM code and transmits the identifier to a remote server to update a database of parts associated with the object. Accordingly, as the user uses the dual mode reader to read DPM codes on a plurality of objects that form the product, the database of parts is updated to include an indication of each object that forms the product.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for reading barcodes and direct part marking (DPM) codes, the apparatus comprising:
a housing;
a first imaging assembly housed within the housing, the first imaging assembly including a first image sensor, wherein the first imaging assembly (i) has a first field of view (FOV) with a first FOV central axis and (ii) is configured to have a working range extending beyond about 5 inches;
a second imaging assembly housed within the housing, the second imaging assembly including a second image sensor, wherein the second imaging assembly (i) has a second FOV with a second FOV central axis and (ii) is configured to have a working range extending up to about 5 inches; and
an illumination assembly configured to provide an illumination light having a central illumination axis, the central illumination axis being substantially parallel to the first FOV central axis,
wherein at least two of the first FOV central axis, the second FOV central axis, and the central illumination axis pass through a plane within a first distance of no greater than about 40 mm of each other, the plane being normal to the first FOV central axis and being a second distance between about 0 to about 5 inches from a nose of the housing.

2. The apparatus of claim 1, wherein each of the first FOV central axis, the second FOV central axis, and the central illumination axis pass through the plane within the first distance of no greater than about 40 mm of each other.

3. The apparatus of claim 1, wherein:
an intersection angle between the second FOV central axis and the central illumination axis at the normal plane is about 50° to about 70°.

4. The apparatus of claim 1, wherein the housing defines a head cavity and a base cavity.

5. The apparatus of claim 4, wherein:
the first image sensor and at least one of the second image sensor or the illumination assembly are disposed within the head cavity.

6. The apparatus of claim 5, wherein:
the second image sensor is disposed in the base cavity, and
the illumination assembly is disposed in the head cavity.

7. The apparatus of claim 5, wherein:
the second image sensor is disposed in the head cavity, and
the illumination assembly is disposed in the base cavity.

8. The apparatus of claim 1, wherein the second FOV central axis intersects the plane at about the same angle at which the central illumination axis intersects the plane.

9. The apparatus of claim 1, wherein a second distance from the nose of the housing to the plane defines an optimal distance for reading DPM codes, and wherein the apparatus further comprises:
one or more processors configured to:
analyze a first set of image data captured by the first imaging assembly to detect a presence of a feature of a DPM code on an object;
determine a third distance from the nose of the housing to the DPM code; and
compare the second distance to the third distance.

10. The apparatus of claim 1, wherein the one or more processors are configured to:
analyze a first set of image data captured by the first imaging assembly to determine a first position of a feature of the DPM code with respect to the first set of image data;
analyze a second set of image data captured by the second imaging assembly to determine a second position of the feature of the DPM code with respect to the second set of image data;
compare (i) a difference between the first position and the second position to an angular offset between the first FOV central axis and the second FOV central axis or (ii) a displacement of the first position from a central pixel of the first set of image data to a displacement of the second position from a central pixel of the second set of image data; and
based on the comparison, determine a direction to move to move at least one of the apparatus or the object to reduce the difference between the first position and the second position.

11. The apparatus of claim 10, wherein:
the apparatus further includes a feedback unit, and
the one or more processors are further configured to:
determine that the third distance to the DPM code is not within a threshold distance of the second distance, and
cause the feedback unit to provide an indication of a direction to move at least one of the apparatus or the object to reduce a difference between the second distance and the third distance.

12. The apparatus of claim 11, wherein:
the feedback unit includes one or more of (i) a speaker, (ii) one or more light emitting diodes, and (iii) a vibrator, and
the one or more processors are configured to provide one or more of (i) an audio indication, (ii) a visual indication of the direction to move at least one of the apparatus or the object, and (iii) a haptic indication.

13. The apparatus of claim 1, wherein the second imaging assembly has a higher pixel density than the first imaging assembly.

14. The apparatus of claim 1, wherein the second FOV of the second imaging assembly is narrower than the first FOV of the first imaging sensor.

15. The apparatus of claim 1, wherein the apparatus further comprises:
one or more processors configured to:
analyze the second set of image data decode a DPM code on an object;
determine an identifier of the object encoded by the DPM code; and
transmit the identifier to a remote server to update a database of parts associated with the object.

* * * * *